United States Patent [19]

Flasher

[11] Patent Number: 5,082,297
[45] Date of Patent: Jan. 21, 1992

[54] GASKET AND GASKETED JOINT

[75] Inventor: Gary L. Flasher, Spring City, Pa.

[73] Assignee: Davlyn Manufacturing, Spring City, Pa.

[21] Appl. No.: 629,533

[22] Filed: Dec. 18, 1990

[51] Int. Cl.⁵ ............................................ F16J 15/16
[52] U.S. Cl. ................................. 277/230; 277/227; 277/229
[58] Field of Search ....................... 277/227, 229, 230

[56] References Cited

U.S. PATENT DOCUMENTS

| | | |
|---|---|---|
| 2,766,055 | 10/1956 | Poltorak .............................. 277/227 |
| 2,882,082 | 4/1959 | Poltorak et al. . |
| 2,924,471 | 2/1960 | Poltorak et al. . |
| 3,545,769 | 12/1970 | Berridge ............................. 277/230 |
| 3,934,064 | 1/1976 | Lowthian . |
| 4,115,609 | 9/1978 | Denman .............................. 277/239 |
| 4,189,618 | 2/1980 | Bretts et al. . |
| 4,219,204 | 8/1980 | Pippert ............................... 277/230 |
| 4,310,163 | 1/1982 | Pippert ............................... 277/230 |
| 4,581,882 | 4/1986 | Pallo et al. ........................ 277/227 |
| 4,715,609 | 12/1987 | Mino et al. ........................ 277/229 |
| 4,931,326 | 6/1990 | Weil . |

Primary Examiner—William A. Cuchlinski, Jr.
Assistant Examiner—Daniel G. DePumpo
Attorney, Agent, or Firm—Panitch Schwarze Jacobs & Nadel

[57] ABSTRACT

The gasket of the present invention includes a length of rope having a circumferential outer surface. The rope is formed at least substantially by a plurality of woven fibrous yarns. The gasket further includes an elastomeric coating adhered to the circumferential outer surface of the rope along the length of the rope. The coating is applied to more than one-half and less than all of the circumferential outer surface so as to expose part of the circumferential outer surface along a single side of the rope. A layer of contact adhesive may be applied directly to the exposed part of the circumferential outer surface to adhere the gasket to a non-adhesive surface. The gasket is beneficially employed between sections of a sectional boiler.

10 Claims, 1 Drawing Sheet

GASKET AND GASKETED JOINT

BACKGROUND OF THE INVENTION

It is well known to construct sectional boilers by joining individual boiler flue sections together. The joints between the boiler flue sections were originally sealed with asbestos However, asbestos has been found to be environmentally hazardous and substitute materials have been sought.

One gasketing material which has been tried is glass fiber rope. However, that material was found not to provide an adequate seal in all instances, especially around the fire box in a gas-fired boiler.

Typically, asbestos gaskets would be applied to one of the mating faces of the sections before the sections were joined. Lengths of twenty to up to one hundred feet of the gasket had to be applied to a vertical mating surface of one of the two sections of the boiler being joined and held in position until the sections were secured together.

SUMMARY OF THE INVENTION

In one aspect, the invention is a gasket comprising: a length of rope having a circumferential outer surface, the rope being formed at least substantially by a plurality of interwoven fibrous yarns; and an elastomeric coating adhered to the outer circumferential surface of the rope along the length of the rope, the coating being applied to more than one-half and less than all of the circumferential outer surface of the rope so as to expose part of the circumferential outer surface along a single side of the rope.

In another aspect, the invention is the gasket in combination with a first conduit member of an opening therethrough and a second member mated with the first member so as to cover the opening, the gasket being positioned between the first and second members at least substantially surrounding the opening with the exposed part of the gasket outer surface compressed against a surface of one of the first and second members so as to contact the one member with the elastomeric coating along opposing sides of the exposed part of the rope outer surface.

BRIEF DESCRIPTION OF THE DRAWINGS

The foregoing summary, as well as the following detailed description of preferred embodiments of the invention, will be better understood when read in conjunction with the appended drawings For the purpose of illustrating the invention, there is shown in the drawings, embodiments which are presently preferred. However, it should be understood that the invention is not limited to the precise arrangements and instrumentalities shown. In the drawings.

DETAILED DESCRIPTION OF PREFERRED EMBODIMENTS

Figure 1:
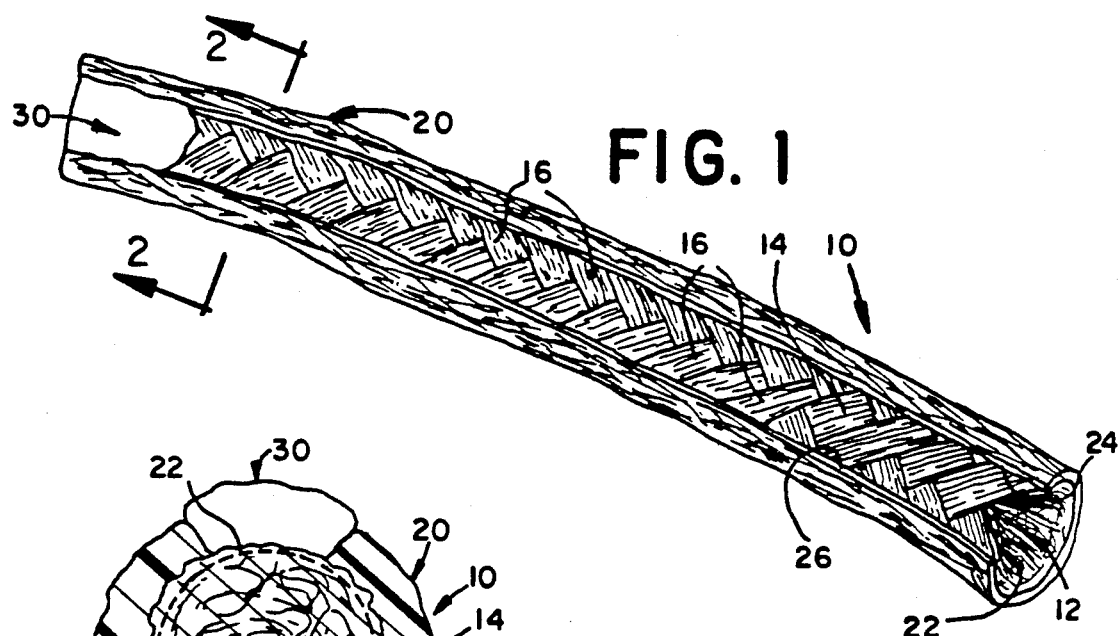
FIG. 1 is a schematic perspective view of a partial length of gasket according to the present invention.
Figure 2:
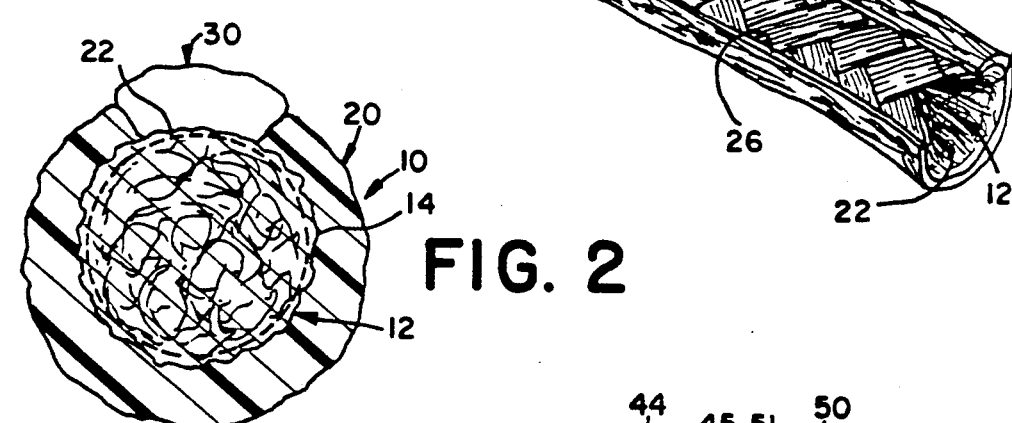
FIG. 2 is a cross section of the gasket of FIG. 1 taken along the lines 2—2.
Figure 4:
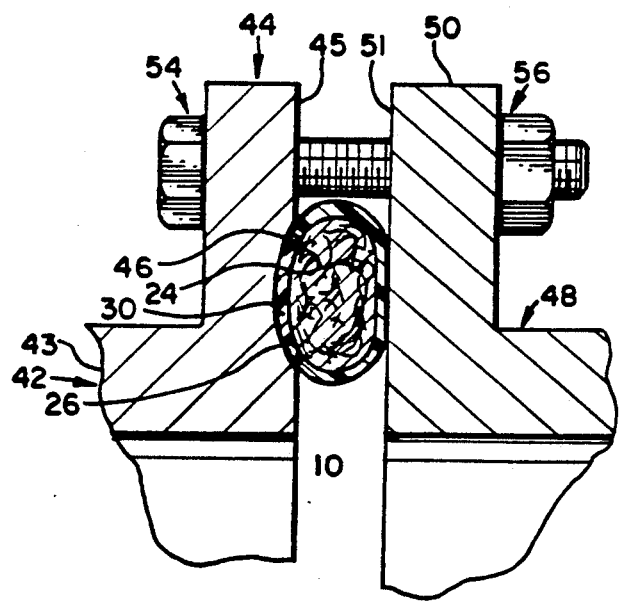
FIG. 4 is an enlarged sectional view of the sectional boiler of FIG. 3 taken along the lines 4—4 of FIG. 3.

Referring to the drawings, like numerals are employed for the indication of like elements throughout. There is shown in FIGS. 1, 2 and 4 a preferred gasket according to the present invention indicated generally at 10. The basic form of the gasket 10 comprises a length of rope, indicated generally at 12, having a circumferential outer surface, indicated generally at 14. The rope is formed at least substantially by a plurality of interwoven fibrous yarns, several of the individual yarns being indicated at 16. Adhered to the circumferential outer surface 14 of the rope 12 along the length of the rope 12 is an elastomeric coating, indicated at 20. The coating 20 is applied and adhered to more than one-half and less than all of the outer circumferential surface 14 of the rope 12 so as to at least substantially seal the covered portion of the rope against fluid (gas or liquid) penetration. The coating 20 is applied in a manner which exposes part of the outer circumferential surface of the rope along a single side of the rope. Both the outer circumferential surface and its exposed portion are indicated generally by reference numeral 22. Preferably, the rope 12 is woven in a conventional manner from glass fiber yarns. Glass fiber is an inert material having good resistance to damage induced from heat, moisture and other environmental conditions which might be encountered in using the product. Knitting is preferred as a relatively easy way to weave a flexible rope from glass fiber yarns. Alternatively, the glass fiber yarns can be braided together into the rope 12. Of course, the rope 12 could also be made, in whole or in part, of another material(s) including, for example, metal wire or polymeric material(s) including but not limited to Kevlar TM . Such material(s) could be provided within individual yarns or as yarn(s) within the rope as a minor or major component.

The elastomeric coating 20 can be any of a variety of conventional, natural or synthetic elastomeric materials including, but not limited to plasticized vinyls, such as ethylene/vinyl acetate copolymer, ethylene/propylene copolymers, ethylene/propylene/diene terpolymers, polybutadiene, isoprene, neoprene, butyl rubber and silicone rubber, preferably one of the various room temperature vulcanizing ("RTV") rubbers, well known to those of ordinary skill in this technology, as well as natural elastomeric materials. Silicone rubber is widely preferred for a number of uses, including the preferred use of the present invention in sectional boilers, particularly because of its unusually good resistance to damage from high temperatures.

Such elastomeric materials can be applied to the rope 12 by any method and means suitable for the material employed including, but not limited to, casting, coating, injection molding and, preferably, extruding. A method and apparatus for low pressure extrusion of an RTV rubber, including silicone rubber compositions, is disclosed in U.S. Pat. No. 4,931,326 which is incorporated by reference herein in its entirety. To provide the partial circumferential coverage of the present invention by the apparatus and method disclosed in that patent, the outlet of the annular reservoir would only extend partially around the circumference of the rope 12 to apply the coating 20 only to that portion of the rope. In addition, the extrusion head could be provided with a guide sized and positioned to contact the circumferential part of the rope which is not to be covered with the outer covering 20 to assist in keeping that part of the rope outer circumferential surface clean. In this way, the continuous stripe of the outer circumferential surface of the rope is exposed while the rubber or other elastomeric material is applied to the remainder of this circumferential outer surface of the rope.

The low-pressure extrusion system described in U.S. Pat. No. 4,931,326 is further preferred as it has been found to provide good mechanical adhesion between the material forming the waterproof coating and the fibrous yarn forming the rope. In particular, the room-temperature vulcanizing silicone rubber described in that patent has been found under the described low-pressure extrusion conditions, to actually penetrate the glass fibers at the outer circumferential surface of the rope and to flow through and around those fibers providing a mechanical adhesion and attachment between the covering and the circumferential outer surface of the rope, even with silicone rubber. This is illustrated diagrammatically in FIG. 2 by the broken line representing diagrammatically the innermost penetration of the coating 20 into the rope 12. The coating is applied to more than one-half and less than all of the circumferential outer surface of the rope. Desirably, a sixty to one-hundred and twenty degree sector, preferably about a ninety degree sector (i.e. about one-quarter) of the entire outer circumferential surface of the rope is exposed.

Also depicted in FIGS. 1 and 2 of the present invention is a modification to the basic gasket. That modification includes the application of a layer of contact adhesive, indicated generally at 30 in the FIGURES, to the exposed part 22 of the rope 12 for adhering the gasket 10 to a non-adhesive surface. The contact adhesive layer 30 may be any conventional material, for example an acrylic adhesive or a layer of an uncured, room-temperature vulcanizing rubber, adhering to the rope material and surface to which the gasket 10 is being applied. The layer 30 may also be applied in bulk form, for example with a caulk gun, or as a preformed strip, for example, with a release cover.

Figure 3:
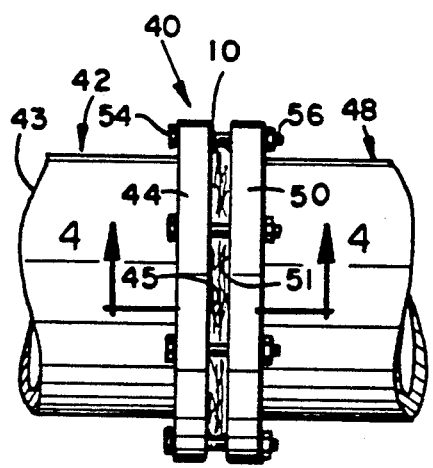
FIG. 3 is a schematic side elevation of a pertinent part of a sectional boiler incorporating the gasket of the present invention.

FIGS. 3 and 4 depict diagrammatically the preferred end use of the gasket 10. The gasket 10 is positioned between first and second conduit section members 42 and 48, respectively, of a sectional boiler, indicated generally at 40. Each depicted conduit member 42 and 48 includes a tubular portion 43 and 49, respectively, having a pair of open ends and a pair of generally axially extending mating flanges 44 and 50, respectively, at each open end. Facing end surfaces 45 and 51, respectively, of each of the flanges 44 and 50 are butted together with the gasket member 10 therebetween surrounding the tubular portion 43 and 49 of each member 42 and 48, respectively. The sections 42 and 48 may be held together by conventional means such as bolts 54 extended through openings in the flange 44 and 50 and secured with nuts 56. While tubular sections 42 and 48 are shown, either could be a cover member such as a removable panel or even a door.

FIG. 4 depicts diagrammatically a joint formed by the gasket 10 in combination with the first and second conduit members 42 and 48, respectively. Mating surface 45 may be provided with a circumferential groove 46 for receiving the gasket 10. Though not depicted, a similar circumferential groove could be provided on the surface 51. In use, the layer of contact adhesive 30 could be applied to the exposed part 22 of the gasket 10 along the length of the gasket just before or while the gasket 10 is being applied to the groove 46 of the mating surface 45. However, an alternate method, which may actually be preferred where long lengths of gasket are being installed, would be to apply a bead or layer of contact adhesive directly to a mating surface 45/46 and then apply the exposed portion 22 of the rope to the adhesive. The gasket 10 is thus adhered in either way to the non-adhesive surface 45 within the groove 46, the gasket extending circumferentially around the open end of the section member 42. The exposed portion 22 of the rope is pressed against the adhesive layer and into the groove 46 or at least against the surface 45, with the exposed portion 22 centered against that surface 45 and groove 46. When the second section member 48 is mated to the first and secured together, flange end surface 51 compresses the gasket 10 against the end surface 45 in groove 46 sufficiently so that longitudinal edges 24 and 26 of the outer elastomer coating 20 along opposing sides of the exposed part 22 of the outer surface contact, compress against and are covered by the mating flange surface 45 so as to form a substantially if not essentially leakproof fluid seal, preventing, for example, heated gas from the interior of the boiler from escaping through the joint. It has been found that a rope fully covered with silicone rubber, for example, cannot be as readily adhered to the joint mating surface as the well known contact adhesives at least previously used in this application do not adhere well with silicone rubber. It was found that this made it difficult to secure the resulting gasket on one vertical mating face 45/46 before the boiler sections were joined.

While preferred embodiments of the present invention have been disclosed, and changes thereto have been suggested, it will be recognized by those skilled in the pertinent arts that changes could be made to the above-described embodiments in the invention without departing from the broad inventive concepts thereof. It should be understood, therefore, that this invention is not limited to the particular embodiments disclosed, but is intended to cover any modifications which are within the scope and spirit of the invention, as defined by the following claims.

I claim:

1. A gasket comprising:
   a length of rope having a circumferential outer surface, the rope being formed at least substantially by a plurality of interwoven fibrous yarns; and
   an elastomeric coating adhered to the circumferential outer surface of the rope along the length of the rope, the coating being applied to more than one-half and less than all of the circumferential outer surface of the rope so as to expose part of the circumferential outer surface only along a single side of the rope.

2. The gasket of claim 1 further comprising a layer of contact adhesive means applied to the exposed part of the circumferential outer surface for adhering the gasket to a non-adhesive surface.

3. The gasket of claim 1 wherein the exposed part of the circumferential outer surface is about one quarter of the entire circumferential outer surface of the rope.

4. The gasket of claim 1 wherein the rope is at least predominantly formed by knitted glass fiber fibrous yarn.

5. The gasket of claim 4 wherein the elastomeric coating comprises silicone rubber.

6. The gasket of claim 5 wherein the elastomeric coating consists essentially of silicone rubber.

7. The gasket of claim 6 wherein the rope is at least predominantly formed by knitted glass fiber fibrous yarn.

8. The gasket of claim 1 wherein the elastomeric coating is extruded at a relatively low pressure onto the rope so as to penetrate only the circumferential surface of the rope.

9. The gasket of claim 1 in combination with a first conduit member having an opening therein and a second member mated with the first member so as to cover the opening, the gasket being positioned between the first and second members at least substantially surrounding the opening with the exposed part of the gasket outer surface compressed against an outer surface of one of the first and second conduit members so as to contact the one conduit member with longitudinal edges of the elastomeric coating along opposing sides of the exposed part of the outer surface.

10. The combination of claim 9 further comprising a layer of an adhesive between the exposed part of the gasket and the one conduit member receiving the gasket.

* * * * *